United States Patent [19]

Asami

[11] Patent Number: 5,173,025
[45] Date of Patent: Dec. 22, 1992

[54] SCREW GROMMET HAVING A SECURED INTERNAL THREAD MEMBER

[75] Inventor: Goro Asami, Yokohama, Japan
[73] Assignee: Nifco Inc., Japan
[21] Appl. No.: 813,382
[22] Filed: Dec. 26, 1991
[51] Int. Cl.$^5$ .................. F16B 13/04; F16B 21/00
[52] U.S. Cl. .................. 411/344; 411/21; 411/182
[58] Field of Search .............. 411/21, 340, 342, 344, 411/345, 173, 177, 182, 108, 112

[56] References Cited

U.S. PATENT DOCUMENTS

| | | | |
|---|---|---|---|
| 2,024,871 | 12/1935 | Parsons | 411/342 |
| 4,284,378 | 8/1981 | Mizusawa | 411/21 |
| 4,553,889 | 11/1985 | Le Dentec et al. | 411/344 |
| 4,749,224 | 6/1988 | Kurihara . | |

FOREIGN PATENT DOCUMENTS

| | | | |
|---|---|---|---|
| 2845000 | 4/1980 | Fed. Rep. of Germany | 411/21 |
| 3738233 | 5/1989 | Fed. Rep. of Germany | 411/21 |
| 63-8410 | 1/1963 | Japan . | |
| 61-192908 | 8/1986 | Japan . | |
| 62-106818 | 7/1987 | Japan . | |
| 38137 | 1/1915 | Sweden | 411/342 |

*Primary Examiner*—Neill R. Wilson
*Attorney, Agent, or Firm*—Parkhurst, Wendel & Rossi

[57] ABSTRACT

A screw grommet with which an externally threaded member is threadedly engaged in a state in which the screw grommet is inserted through an attaching hole formed in a member to which the screw grommet is to be attached. An externally threaded member is passed through a head having a through hole, and the head abuts against the member to which the screw grommet is to be attached. The externally threaded member is then inserted through a leg which projects from the head and is inserted through the member to which the screw grommet is to be attached. The externally threaded member is threadedly engaged with an internal thread member. A pair of pawls are formed on a part of the internal thread member and are, together with the internal thread member, inserted in the leg in a state in which the diameter of the pawls is reduced. When the internal thread member approaches the head, the diameter of the pawls is enlarged in such a manner as to clamp the member to which the screw grommet is to be attached. When the internal thread member is moved away from the head, the diameter of the pawls is reduced so as to allow passage of the pawls through the attaching hole formed in the member to which the screw grommet is to be attached. The pawls hold the internal thread member in such a manner as to prevent the internal thread member from falling from the leg.

25 Claims, 10 Drawing Sheets

SCREW GROMMET HAVING A SECURED INTERNAL THREAD MEMBER

BACKGROUND OF THE INVENTION

1. Field of the Invention

The present invention relates to a screw grommet with which an externally threaded member is threadedly engaged in a state in which the screw grommet is inserted through an attaching hole formed in a member to which the screw grommet is to be attached, so as to secure an article onto the member.

2. Description of the Related Art

In automobiles, screw grommets are used to install various members. For instance, in the case of screw grommets for installing a molding which is provided around a peripheral portion of a rear windshield, the screw grommets are fitted to the molding and are inserted in and secured through attaching holes formed in a body panel, so as to secure the molding onto the body panel.

A known screw grommet of this type is structured such that an internal thread member is connected via a thin-walled portion to a leg extending downwardly from the underside of a head having a through hole for insertion of an externally threaded member therethrough (Japanese Patent Application Laid-Open No. 61-192908 and Japanese Utility Model Application Laid-Open No. 63-8410). According to this structure, the internal thread member together with the leg is inserted through an attaching hole formed in a body panel. In this inserted state, a tapping screw is threadedly engaged with the internal thread member through the through hole formed in the head. When the tapping screw is threadedly engaged with the internal thread member, the internal thread member enters the interior of the leg by breaking a thin-walled portion and enlarges the diameter of the leg. As the diameter of the leg is enlarged, the body panel is clamped by the leg and the head and the grommet is thereby secured to the body panel.

With this structure, however, since the thin-walled portion is broken by the threaded engagement of the tapping screw at the time of use, if the tapping screw is loosened during dismantling, the internal thread member is disengaged from the tapping screw and falls down below the body panel. In some cases it becomes impossible to take out the internal thread member. In addition, since the internal thread member is separated from the leg during dismantling, the screw grommet cannot be reused after it has been used once.

SUMMARY OF THE INVENTION

In view of the above-described circumstances, it is an object of the present invention to provide a screw grommet in which an internal thread member is not separated from its leg or main body, even if an externally threaded member, such as a tapping screw, is loosened at the time of dismantling. Another object is to provide a screw grommet which can be reused.

To this end, in accordance with the present invention, there is provided a screw grommet with which an externally threaded member is threadedly engaged in a state in which the screw grommet is inserted through an attaching hole formed in a member for attachment of the screw grommet thereto, the screw grommet comprising: a body member which abuts against the member for attachment of the screw grommet thereto and through which the externally threaded member is passed; an internal thread member which is threadedly engaged with the externally threaded member which is inserted through the body member; and holding means for holding the internal thread member onto the body member and causing the internal thread member to be drawn out of the attaching hole at the time of removal of the body member.

At the time of securing the body member onto the member for attachment of the screw grommet thereto, the externally threaded member is threadedly inserted into the internal thread member to cause the internal thread member to move in the direction of approaching the head of the externally threaded member. The member for attachment of the screw grommet thereto is clamped by the body member and the holding means whose diameter has been enlarged.

When the body member is removed from the member for attachment of the screw grommet thereto, the externally threaded member is loosened to cause the internal thread member to move away from the head of the externally threaded member. This movement causes the diameter of the holding means to be reduced and allows the body member to be removed from the member for attachment of the screw grommet thereto. Moreover, in this state the holding means holds the internal thread member such that the internal thread member will not be separated from the body member. Thus, it is possible to remove both the internal thread member and the body member from the member for attachment of the screw grommet thereto without causing the internal thread member to fall down.

The above and other objects, features and advantages of the invention will become more apparent from the following detailed description of the invention when read in conjunction with the accompanying drawings.

BRIEF DESCRIPTION OF THE DRAWINGS

FIGS. 1 to 13 illustrate an embodiment of a screw grommet in accordance with the present invention, in which, FIG. 1 is an exploded perspective view;

FIG. 2 is a perspective view illustrating an assembled state of the screw grommet shown in FIG. 1;

FIG. 3 is a cross-sectional view taken along the line 3—3 of FIG. 2;

FIG. 4 is a cross-sectional view taken along the line 4—4 of FIG. 2;

FIGS. 5 to 7 are cross-sectional views illustrating the operation at the time of use in correspondence with FIG. 3;

FIG. 8 is a front elevational view of FIG. 2;

FIG. 9 is a plan view of the screw grommet shown in FIG. 8;

FIG. 10 is a bottom view of the screw grommet shown in FIG. 8;

FIG. 11 is a right side-elevational view of the grommet shown in FIG. 8;

FIG. 12 is a left side-elevational view of the grommet shown in FIG. 8;

FIG. 13 is a rear view of the screw grommet shown in FIG. 8;

DESCRIPTION OF THE PREFERRED EMBODIMENT

Referring now to the accompanying drawings, a detailed description will be given of the embodiments of the present invention.

Figure 1:
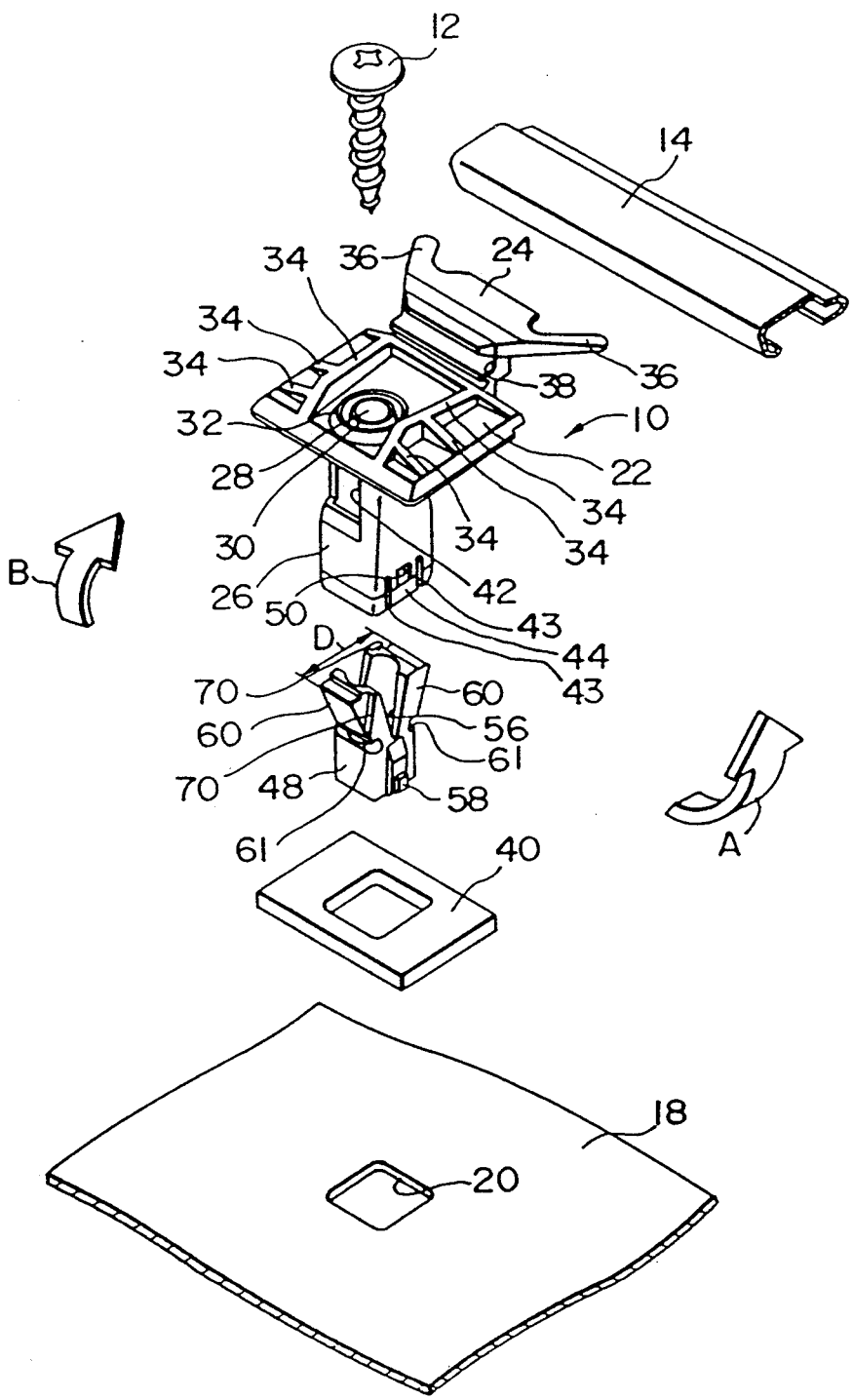

FIGS. 1 to 13 illustrate a screw grommet 10 in accordance with an embodiment of the present invention. As shown in FIG. 1, this screw grommet 10 is used for installing a molding 14 in cooperation with a tapping screw 12.

Figure 14:
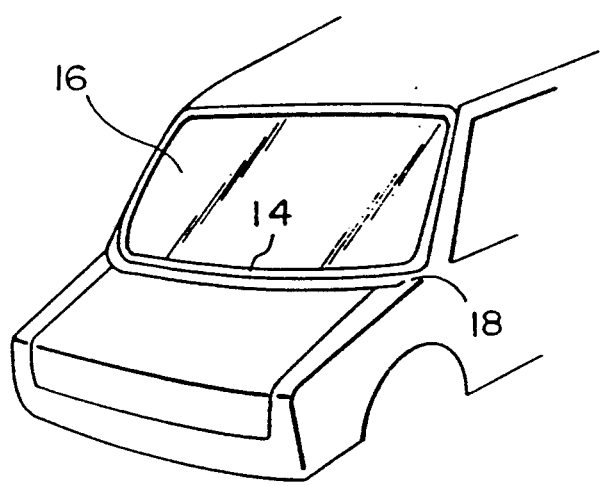
FIG. 14 is a perspective view of a rear portion of an automobile illustrates a state in which a molding is attached by using the screw grommet shown in FIG. 1.

As shown in FIG. 14, the molding 14 is attached to a body panel 18 of an automobile so as to cover a peripheral portion of a rear windshield 16. As shown in FIG. 1, the molding 14 has each of its opposite side portions bent in a substantially U-shaped configuration. The arrangement provided is such that a portion of the screw grommet 10 is inserted into the molding 14 through the gap formed between the opposite sides of the molding 14 so as to fit the screw grommet 10 to the molding 14. A substantially rectangular attaching hole 20 is formed in the body panel 18, and a part of the screw grommet 10 is inserted through this attaching hole 20. As the tapping screw 12 is threadedly engaged with the screw grommet 10 in this inserted state, the screw grommet 10 is secured, with the result that the molding 14, in turn, is secured to the body panel 18 via the screw grommet 10.

Figure 2:
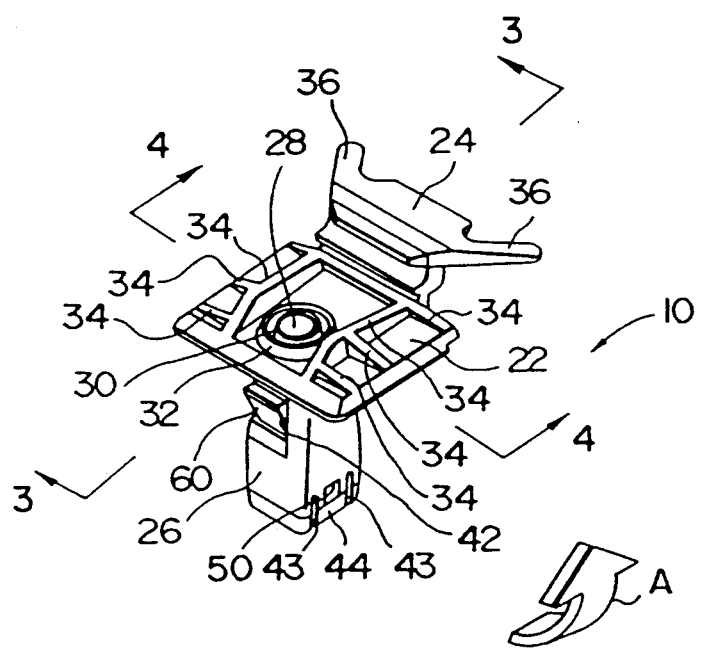

To give a detailed description of the screw grommet 10, as shown in FIGS. 1 and 2, a retainer 24 projects upwardly from one side of a rectangular tabular head 22, and a leg 26 integrally projects downwardly from a lower surface of the head 22.

Figure 9:
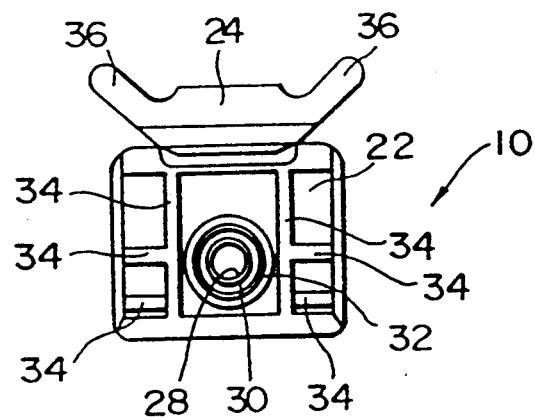
Figure 10:
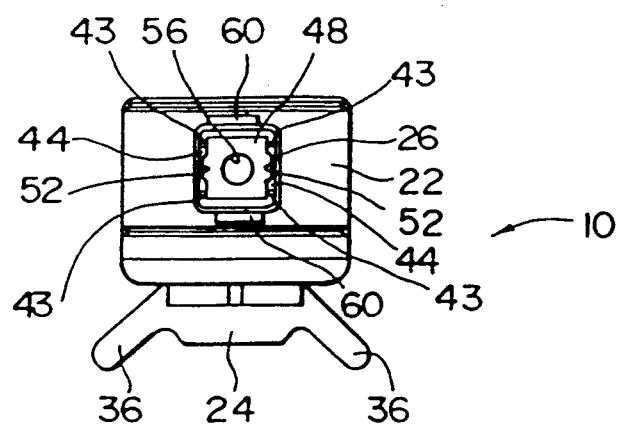

A through hole 28 is formed in a substantially central portion of the head 22, as is also shown in FIG. 9, and the tapping screw 12 is adapted to be threadedly engaged with an internal thread member 48 (which will be described later) of the head 22 through this through hole 28. Two small-diameter hollow cylindrical portions 30, 32, which have different diameters and substantially the same height, project concentrically from an upper surface (the upper surface in FIGS. 1 and 2) of the head 22 in such a manner as to surround the through hole 28. In addition, ribs 34 project in the vicinity of the small-diameter hollow cylindrical portions 30, 32.

The small-diameter hollow cylindrical portions 30, 32 have smaller diameters than the head of the tapping screw 12. When the tapping screw 12 is inserted through the through hole 28 provided in the head 22, the head of the tapping screw 12 abuts against the tops of the hollow cylindrical portions 30, 32 so as to restrict the amount of insertion of the tapping screw 12. In addition, these hollow cylindrical portions 30, 32 are arranged to allow the operator to easily pull out the tapping screw 12 by catching the head of the tapping screw 12 with his fingers when the tapping screw 12 is at a limit of its insertion in an unthreadedly engaged state. The hollow cylindrical portions 30, 32 have thin walls and function as locking members for locking the tapping screw 12 as the head of the tapping screw 12 abuts against the tops of the hollow cylindrical portions 30, 32 when the tapping screw 12 is threadedly engaged. In the threadedly engaged state of the tapping screw 12, there are cases where the small-diameter hollow cylindrical portions 30, 32 are deformed by the tightening force of the tapping screw 12. It should be noted that the wall of the hollow cylindrical portion 30, whose diameter is smaller than that of the other hollow cylindrical portion 32, is slightly less thick than that of that hollow cylindrical portion 32.

Figure 3:
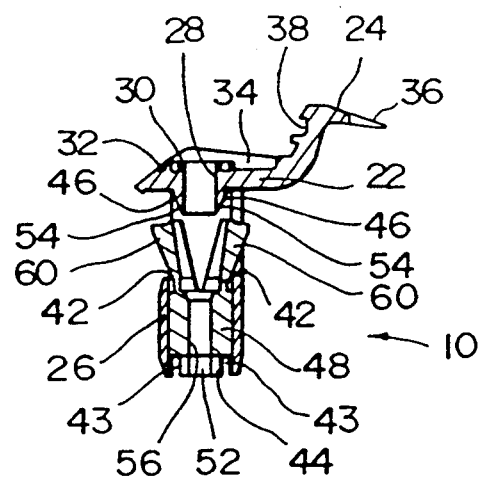
Figure 4:
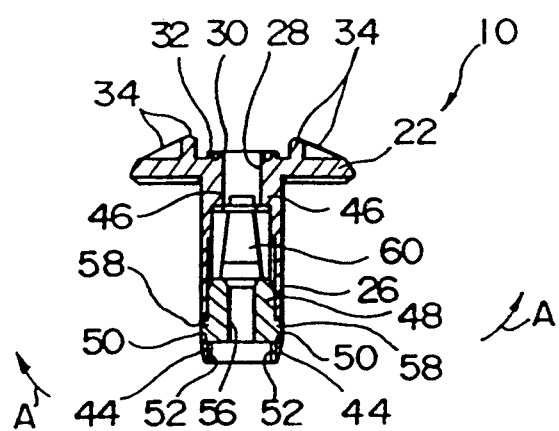

The ribs 34 are provided so as to surround the small-diameter hollow cylindrical portion 32 having a larger diameter than the small-diameter hollow cylindrical portion 30. As also shown in FIGS. 3 and 4, these ribs 34 are slightly higher than the small-diameter hollow cylindrical portions 30, 32 in the vicinity of the small-diameter hollow cylindrical portion 32. This arrangement is provided to ensure that members located in the vicinity of the screw grommet 10 or the fingers of the operator will not be caught by the head of the tapping screw 12 at the limit of its insertion during operation.

Figure 5:
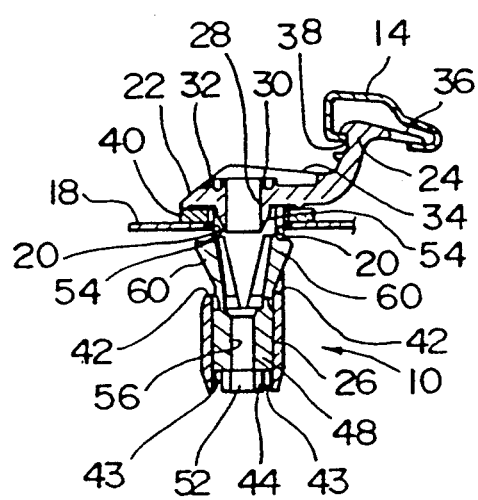

The retainer 24 is bent substantially orthogonally at an intermediate portion thereof, and its distal end portion extends substantially horizontally in a direction away from the head 22. A pair of small-width projections 36 respectively project horizontally diagonally from opposite ends of the retainer 24 such that the distance between the pair of projections 36 becomes gradually larger toward the distal ends thereof. As also shown in FIG. 3, a recess 38 is formed horizontally at an intermediate portion of the retainer 24 on the side thereof which is remote from the side from which the projections 36 project. The recess 38 is used to retain the molding 14 in cooperation with the projections 36. That is, the arrangement provided is such that, at the time of fitting the retainer 24 to the molding 14, the screw grommet 10 is rotated in the direction of arrow B in FIG. 1 with the tips of the projections 36 inserted in one U-shaped side portion of the molding 14 (the right-hand side in FIG. 1). This rotation causes the other side of the molding 14 to be accommodated in the recess 38 with the projections 36 inserted in one side of the molding 14, as shown in FIG. 5, thereby fitting the retainer 24 to the molding 14.

Figure 11:
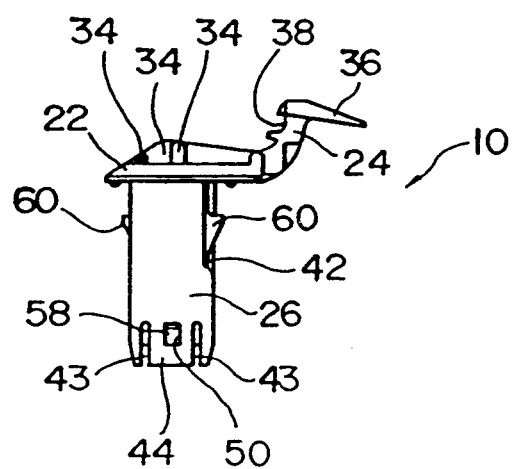
Figure 12:
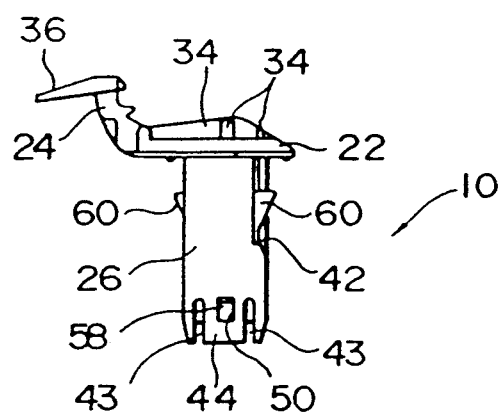

As also shown in FIGS. 3 and 4, the leg 26 has a hollow interior formed concentrically with and communicating with the through hole 28 formed in the head 22, and has a square-shaped cross section. The tapping screw 12 is adapted to be inserted into the interior of the leg 26 through the through hole 28 in the head 22. In addition, as also shown in FIGS. 11 and 12, the distal end of the leg 26 is tapered so as to be easily inserted through the attaching hole 20 formed in the body panel 18. In addition, a sealing member 40 is fitted to the leg 26 in the vicinity of a proximal portion thereof which is connected to the head 22. In this fitted state, the leg 26 is inserted through the attaching hole 20. The sealing member 40 is formed of a soft material and is interposed between the surface of the body panel 18 and the head 22 with the leg 26 inserted through the attaching hole 20 in the body panel 18, as shown in FIG. 5, so as to provide sealing for the two members.

Figure 8:
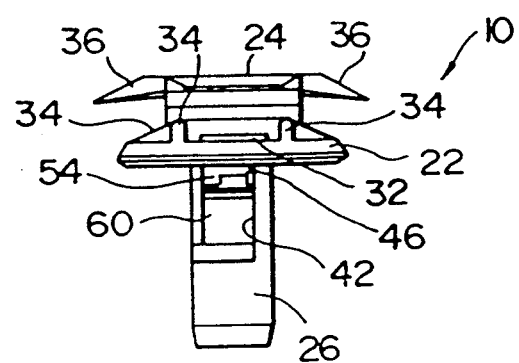
Figure 13:
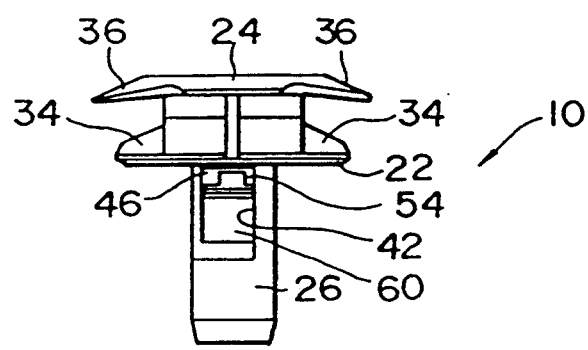

As also shown in FIGS. 8 and 13, the leg 26 has a pair of windows 42 respectively formed in the walls of the leg 26 which oppose each other with the axis of the leg 26 placed therebetween. The pair of windows 42 are formed in the vicinity of the proximal portion of the leg 26 connected to the head 22 so as to allow the interior of the leg 26 to communicate with the outside. As also shown in FIGS. 11 and 12, a pair of parallel slits 43 are formed in each of the remaining opposing walls where the windows 42 are not formed, in such a manner as to be cut from the distal end of each of these opposing walls. A portion formed between the pair of slits 43 serves as a resilient piece 44 and is capable of being resiliently deformed in the direction of expanding or shrinking the hollow portion (in the direction of arrow A and in the opposite direction to that of arrow A in FIG. 1).

A substantially rectangular engaging hole 50 is formed in each of these resilient pieces 44 in the vicinity of a proximal portion thereof. An engaging groove 52 is formed in the reverse surface of each resilient piece 44 in correspondence with the engaging hole 50, as shown in FIGS. 4 and 5. The engaging groove 52 is formed in such a manner as to extend the distal end of the resilient piece 44 to the vicinity of the proximal portion of the leg 26, and its intermediate portion communicates with the engaging hole 50.

As shown in FIGS. 3 and 4, a pair of small projections 46 are formed on the underside of the head 22 in face-to-face relationship with each other in correspondence with the respective rear surfaces of opposing wall portions located above the windows 42. The pair of small projections 46 are formed in such a manner as to project downwardly from the vicinity of and flush with the inner periphery of the through hole 28 and extend the axial length of the through hole 28. A side of each of these small projections 46 facing the window 42 is formed as an inclined surface 54 which rises diagonally upwardly toward the head 22.

As also shown in FIGS. 3 and 4, an internal thread member 48 is adapted to be accommodated in the interior of the leg 26. With the internal thread member 48 accommodated in the leg 26, the leg 26 is inserted through the attaching hole 20 provided in the body panel 18, as shown in FIG. 5.

The internal thread member 48 has a substantially rectangular outer peripheral cross section in correspondence with the hollow interior of the leg 26. The internal thread member 48 is inserted through the distal end of the leg 26 and further into the interior of the leg 26 and is accommodated therein in such a manner as to be incapable of rotating but movable in the longitudinal direction of the leg 26. A threaded engagement hole 56 is formed in an axial portion of the internal thread member 48 such that the tapping screw 12 is threadedly engaged with the threaded engagement hole 56 through the through hole 28 formed in the head 22 in a state in which the internal thread member 48 is accommodated in the leg 26.

As shown in FIG. 1, a pair of engaging projections 58 are formed integrally on the outer periphery of the internal thread member 48. When the internal thread member 48 is accommodated in the leg 26, each engaging projection 58 is engaged with the respective engaging groove 52 formed in the leg 26 and is guided by the engaging groove 52 until it is fitted into the engaging hole 50. When the internal thread member 48 is accommodated in the leg 26, each engaging projection 58 is engaged with the engaging groove 52 by resiliently deforming the resilient piece 44 in the direction of enlarging the diameter of the leg 26 (in the direction of arrow A). When the engaging projection 58 corresponds to the engaging groove 52, the engaging projection 58 is fitted into the engaging hole 50 by means of the resiliency of the resilient member 44, as shown in FIG. 4.

When the engaging projections 58 are fitted in the respective engaging holes 50, the movement of the internal thread member 48 in the longitudinal direction of the leg 26 is restricted (a temporarily locked state).

Figure 6:
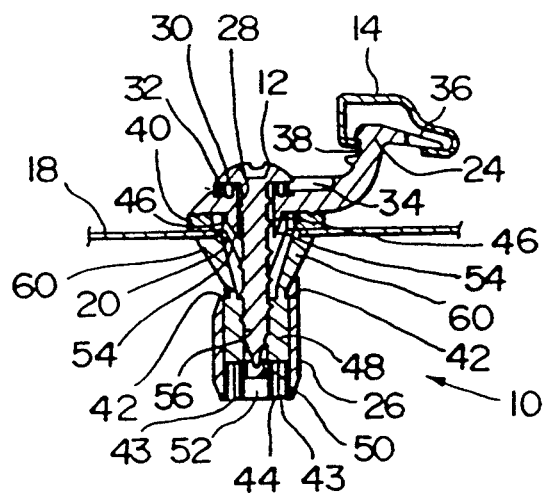
Figure 7:
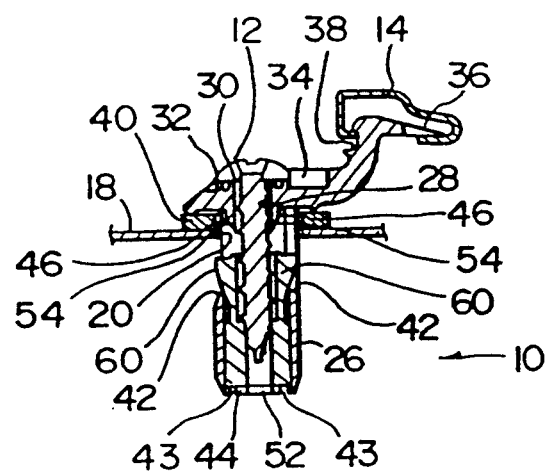

However, this state is canceled by the tightening force of the tapping screw 12 or by a pressing force occurring when the internal thread member 48 is pressed downwardly in the longitudinal direction of the leg 26 (in a direction away from the head) with a large force. That is, when the tapping screw 12 is threadedly engaged with the threaded engagement hole 56, which is formed in the internal thread member 48, in the temporarily locked state with the engaging projections 58 fitted in the respective engaging holes 50, a moving force acting upwardly in the longitudinal direction of the leg 26 (i.e., in the direction of approaching the head) is imparted to the internal thread member 48 by the tightening force of the tapping screw 12 at that time. Thus, the engaging projections 58 are made to slip out of the respective engaging holes 50 by that moving force, as shown in FIG. 6. In addition, when the internal thread member 48 is pushed downwardly in the longitudinal direction of the leg 26 (in the direction away from the head) with a large force in the temporarily locked state with the engaging projections 58 fitted in the respective engaging holes 50, a moving force acting downwardly in the longitudinal direction of the leg is imparted to the internal thread member 48 by that pressing force. The engaging projections 58 are caused to slip out of the respective engaging holes 50 by that moving force, as shown in FIG. 7.

A pair of pawls 60 are respectively formed integrally on upper ends of the remaining opposite sides of the internal thread member 48 where the engaging projections 58 are not formed. A pair of grooves 61 are each formed horizontally in a proximal portion of the pawl 60 connected to the internal thread member 48 and allow distal end portions of the pawls 60 to move toward or away from each other. The mutually facing surfaces of the pawls 60 serve as guide surfaces for guiding the tapping screw 12 into the threaded engagement hole 56 formed in the internal thread member 48.

When accommodating the internal thread member 48 in the interior of the leg 26, these pawls 60 are first inserted into the interior of the leg 26 beginning with the tips thereof. The pawls 60 in their free state are formed such that the outside dimension thereof becomes gradually larger starting from their proximal portions connected to the internal thread member 48 toward their distal ends. Thus, their maximum outside dimension D (shown in FIG. 1) is set to be greater than the inside dimension of the leg 26, and the pawls 60 are resiliently deformed in a mutually approaching direction at the time when they are accommodated in the interior of the leg 26. In addition, each of the pawls 60 is provided with a tapered wall such that the wall becomes gradually thicker starting from the proximal portion of the pawl 60 connected to the internal thread member 48 toward its distal end. It should be noted that inclined surfaces 70, which are inclined in opposite directions, are each formed in the respective pawl 60 adjacent the tapered surface thereof. A jig or the like is brought into contact with the inclined surfaces 70 when the internal thread member 48 is accommodated in the interior of the leg 26 so as to cause the pawls 60 to undergo resilient deformation in the mutually approaching direction.

In the temporarily locked state of the internal thread member 48 in which the engaging projections 58 of the internal thread member 48 are fitted into the respective engaging holes 50 in the leg 26, as shown in FIG. 4, the pawls 60 project from inside to outside the leg 26 through the respective windows 42 formed in the leg 26, as shown in FIG. 3, thereby retaining the internal thread member 48 on the leg 26 so that the internal thread member 48 will not fall downwardly from the leg 26. In addition, as the leg 26 is inserted through the attaching hole 20 in the body panel 18, the pawls 60 are passed through the attaching hole 20 in the body panel 18, and the pawls 60 and the head 22 are capable of clamping the body panel 18 therebetween as the tapping screw 12 is screwed into the internal thread member 48, as shown in FIG. 6. That is, when the leg 26 is inserted through the attaching hole 20 in the body panel 18, the pawls 60 projecting outside the leg 26 through the respective windows 42 in the leg 26 are brought into contact with the inner periphery of the attaching hole 20 in the body panel 18 and pass through the attaching hole 20 in the body panel 18 while undergoing resilient deformation toward the interior of the leg 26. Subsequently, however, the shape of the pawls 60 is restored, and the pawls 60 project from inside to outside the leg 26, as shown in FIG. 5. Then, when the tapping screw 12 is threadedly engaged with the threaded engagement hole 56 in the internal thread member 48 in this state, the internal thread member 48 moves upwardly in the longitudinal direction of the leg 26 (in the direction of approaching the head 22). This movement causes the pawls 60 to be brought into contact with the respective inclined surfaces 54 of the small projections 46 projecting from the underside of the head 22, so that the pawls 60 expand by being pressed by the inclined surfaces 54. The pawls 60, thus pressed and expanded owing to their above-described movement and deformation, are brought into contact with the rear surface of the body panel 18. The body panel 18 is thereby clamped by the pawls 60 and the head 22, as shown in FIG. 6.

Also, since the engaging projections 58 of the internal thread member 48 are fitted into the respective engaging holes 50 in the leg 26, when the pawls 60 are accommodated at a position lower than the temporary locking position of the internal thread member 48 (on the side remote from the head 22), the pawls 60 are capable of passing through the attaching hole 20 in the body panel 18 after being resiliently deformed from outside to inside the leg 26. Concurrently, the pawls 60 are pressed by the inner peripheral surfaces of the leg 26 owing to its resiliency and hold the internal thread member 48 onto the leg 26 so that the internal thread member 48 will not fall downwardly from the leg 26.

The operation of this embodiment will be described hereafter.

With respect to the screw grommet 10, the internal thread member 48 is inserted in advance into the interior of the leg 26 starting with the distal ends of the pawls 60. The internal thread member 48 is temporarily locked at the position in which the engaging projections 58 of the internal thread member 48 are fitted in the respective engaging holes 50 in the leg 26, as shown in FIG. 4. It should be noted that at the time of this temporary locking, the internal thread member 48 is pushed into the distal end of the leg 26 until the engaging projections 58 are made to correspond to the engaging holes 50. At that time, the engaging projections 58 are guided by the respective engaging grooves 52 while resiliently deforming the resilient pieces 44 in the direction of enlarging the diameter (in the direction of arrow A) until the engaging projections 58 are made to correspond to the respective engaging holes 50. At the same time as the engaging projections 58 are made to correspond to the respective engaging holes 50, the engaging projections 58 are fitted into the engaging holes 50 by means of the resiliency of the resilient pieces 44. Accordingly, at the same time as the engaging projections 58 are fitted into the respective engaging holes 50, the force with which the internal thread member 48 is pushed in changes, thereby making it possible to temporarily lock the internal thread member 48 with a click.

When the molding 14 is attached, the retainer 24 is attached in advance to the molding 14, and the sealing member 40 is fitted to the vicinity of the proximal portion of the leg 26. In this state, the leg 26 is inserted through the attaching hole 20 formed in the body panel 18 starting with the distal end of the leg 26.

When the retainer 24 is fitted to the molding 14, the tips of the projections 36 are inserted into one side portion of the molding 14 (the right-hand side in FIG. 1). In this inserted state the screw grommet 10 is rotated about the distal ends of the projections 36 in the direction of arrow B in FIG. 1. As a result, the other side of the molding 14 is accommodated in the recess 38 with the projections 36 inserted in one side of the molding 14, thereby fitting the retainer 24 to the molding 14.

At the time of inserting the leg 26 through the attaching hole 20 in the body panel 18, the leg 26 is inserted as the pawls 60 pass through the attaching hole 20 in the body panel 18 while undergoing resilient deformation toward the interior of the leg 26. As a result, the leg 26 is inserted through the attaching hole 20 in the body panel 18.

With the leg 26 inserted through the attaching hole 20 in the body panel 18, the pawls 60 project from inside to outside the leg 26, as shown in FIG. 5, as the configuration of the pawls 60 is restored after the pawls 60 pass through the attaching hole 20 in the body panel 18. Thus, the leg 26 is prevented from being drawn out by means of the pawls 60. Accordingly, as the leg 26 is inserted through the attaching hole 20 in the body panel 18, the leg 26 is prevented from being drawn out, and the screw grommet 10 is temporarily locked onto the body panel 18.

After the insertion of the leg 26 through the attaching hole 20 in the body panel 18, the tapping screw 12 is threadedly engaged with the threaded engagement hole 56 formed in the internal thread member 48, as shown in FIG. 6. When the tapping screw 12 is threadedly engaged with the threaded engagement hole 56 in the internal thread member 48, the internal thread member 48 moves upwardly in the longitudinal direction of the leg 26 (in the direction of approaching the head 22). This movement causes the pawls 60 to be brought into contact with the respective inclined surfaces 54 of the small projections 46 projecting from the underside of the head 22, so that the pawls 60 expand by being pressed by the inclined surfaces 54. The pawls 60, thus pressed and expanded owing to their above-described movement and deformation, are brought into contact with the rear surface of the body panel 18. The body panel 18 is thereby clamped by the pawls 60 and the head 22. Hence, the molding 14 is installed on the body panel 18.

In this state of installation of the molding 14, the sealing member 40 is interposed between the surface of the body panel 18 and the head 22, and prevents rainwater or the like from entering the interior of the body panel 18 through the attaching hole 20 formed in the body panel 18. In addition, since the head of the tapping screw 12 is surrounded by the ribs 34, members located in the vicinity of the screw grommet 10 or the fingers of the operator are prevented from being caught by the head of the tapping screw 12 during the operation.

After installation of the molding 14, the molding 14 can be removed from the body panel 18 by loosening the tapping screw 12. In addition, the screw grommet 10 can be reused after its removal from the body panel 18.

That is, at the time of removing the screw grommet 10 from the body panel 18, if the tapping screw 12 is loosened, the internal thread member 48 is disengaged from the tapping screw 12 and becomes movable downwardly in the longitudinal direction of the leg 26 (in the direction away from the head 22). If the tapping screw 12 is pushed in this state, the engaging projections 58 are moved in the direction of the distal end of the leg member out from the engaging holes 50, and the pawls 60 undergo resilient deformation from outside to inside the leg 26, as shown in FIG. 7. However, the pawls 60 are pressed by the inner peripheral surfaces of the leg 26 owing to the pawls, resiliency, so that the internal thread member 48 is held by the leg 26 in such a manner that the internal thread member 48 does not fall from the leg 26. In consequence, the leg 26 can be drawn out and removed from the attaching hole 20 in the body panel 18 in a state in which the pawls 60 are prevented from being caught by the inner peripheral surface of the attaching hole 20, or the internal thread member 48 is prevented from falling down below the body panel 18.

Then, after the screw grommet 10 is removed from the body panel 18, if the internal thread member 48 is pushed into the leg 26 until the engaging projections 58 of the internal thread member 48 are fitted into the respective engaging holes 50, the configuration of the pawls 60 is restored at the position where the engaging projections 58 of the internal thread member 48 are fitted into the respective engaging holes 50 in the leg 26, as shown in FIG. 4. As a result, the pawls 60 project from inside to outside the leg 26 through the respective windows 42 in the leg 26. If in this state the operator pulls the tapping screw 12 out of the through hole 28 in the head 22 by catching the head of the tapping screw 12 with his fingers, the screw grommet 10 can be reset to its state prior to use. Hence, the screw grommet 10 can be used again.

Figure 15:
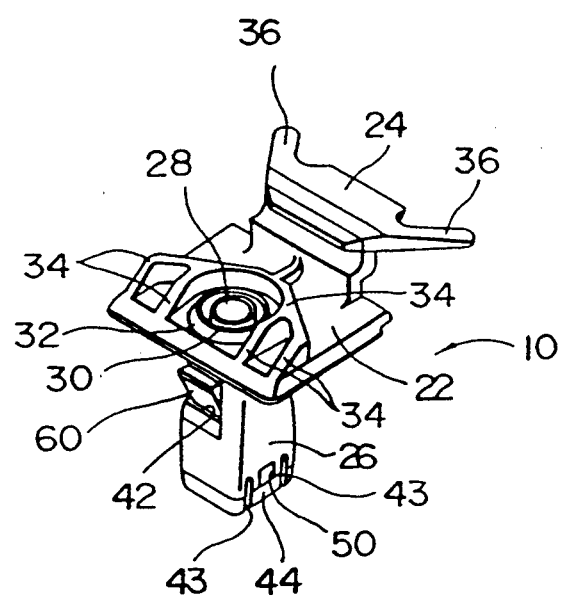
FIG. 15 is a perspective view similar to that of FIG. 2 and illustrates another embodiment.

It should be noted that the ribs 34 may be arranged in the manner such as that shown in FIG. 15, in which the ribs 34 conform with the configuration of a member surrounding the molding 14.

In addition, the holding means used in the screw grommet 10 in accordance with the present invention may be a resilient member or members connecting the head and the internal thread member. In this structure, if the head is pulled in a direction in which it moves away from the body panel 18 during dismantling, the internal thread member is pulled by the resilient member or members, and is drawn out of the attaching hole 20 in the body panel 18.

As described above, with the screw grommet in accordance with the present invention, outstanding advantages can be obtained in that the internal thread member does not fall even if the external thread member is loosened at the time of dismantling, and that the screw grommet can be reused.

What is claimed is:

1. A screw grommet with which an externally threaded member is threadedly engaged in a state in which said screw grommet is inserted through an attaching hole formed in a panel member for attachment of said screw grommet thereto, said screw grommet comprising:

a body member which is adapted to abut against said panel member for attachment of said screw grommet thereto and through which said externally threaded member is passed; and an internal thread member for threaded engagement with the externally threaded member which passes through said body member, said internal thread member comprising holding means cooperable with said body member to clamp said panel member for attachment of said screw grommet thereto as said externally threaded member inserted through said body member is threadedly engaged with said internal member, wherein said holding means is integrally formed as one-piece with said internal thread member, said holding means being adapted to cause said internal thread member to be drawn out of said attaching hole with said body member at the time of removal of said body member.

2. A screw grommet according to claim 1, wherein said body member comprises a head portion for abutment against said panel member for attachment of said screw grommet thereto, and a leg portion projecting from said head portion for insertion through said attaching hole formed in said panel member.

3. A screw grommet according to claim 2, wherein said holding means comprises a resilient member extending from said internal thread member, said resilient member being adapted to undergo resilient deformation.

4. A screw grommet according to claim 2, wherein said leg portion has a hollow interior with a square cross section, and is provided with two opening portions formed in opposite walls of said leg portion.

5. A screw grommet according to claim 2, wherein said internal thread member has a substantially rectangular outer peripheral cross section, and is inserted in a distal end of said leg portion and into the interior of said leg portion, said internal thread member being formed in such a manner as to be incapable of rotating inside said leg portion but movable in the directions of insertion and withdrawal of said externally threaded member.

6. A screw grommet according to claim 4, wherein said holding means comprises a resilient member, wherein at the time of insertion of said internal thread member into the interior of said leg portion, said holding means is inserted with the diameter of its distal portion reduced, such that said resilient member projects outside said leg portion through said opening portions as said holding means is pressed toward said head portion of said body member, such that said resilient member is used for abutting against said panel member for attachment of said screw grommet thereto.

7. A screw grommet according to claim 6, wherein said resilient member comprises an abutment portion for abutment against edges of said opening portions of said leg portion, whereby said resilient member undergoes resilient deformation in a direction of reducing the diameter of said leg portion during abutting contact of said abutting portion with said edges as said internal thread member moves in a direction away form said head portion, wherein said resilient member resiliently deforms to a diameter smaller than an inside diameter of said attaching hole.

8. A screw grommet according to claim 4, wherein each of a pair of opposing walls of said leg portion is provided with an engaging hole for releasable engagement with said internal thread member.

9. A screw grommet according to claim 8, wherein said internal thread member further comprises on an outer periphery thereof a pair of engaging projections for releasable engagement with said engaging holes to temporarily prevent axial movement of said internal threaded member relative to said leg portion.

10. A screw grommet according to claim 1, wherein said internal thread member further comprises a bendable portion to allow rotation of said holding means about said bendable portion.

11. A screw grommet according to claim 10, wherein said bendable portion is defined by two grooves extending along opposite sides of said internal thread member.

12. A screw grommet with which an externally threaded member is threadedly engaged in a state in which said screw grommet is inserted through an attaching hole formed in a panel member for attachment of said screw grommet thereto, said screw grommet comprising:
- a head member adapted to abut against a surface of said panel member for attachment of said screw grommet thereto and through which said externally threaded member is passed;
- a leg member formed on an underside of said head member in such a manner as to project therefrom, said leg member having a hollow interior with a square cross section, said leg member inserted through said attaching hole formed in said panel member and being provided with two opening portions formed in opposite walls of said leg portion; and
- an internal thread member having a substantially rectangular outer peripheral cross section for insertion in a distal end of said leg member and into the interior of said leg member, said internal thread member being formed in such a manner as to be incapable of rotating inside said leg member, but movable in the directions of insertion and withdrawal of said internally threaded member, said internally threaded member passing through said head member and being threadedly engaged with said internal thread member, said internal thread member comprising holding means cooperable with said body member to clamp said panel member for attachment of said screw grommet thereto by enlarging the diameter of said internal thread member at the time of threaded engagement thereof with said externally threaded member, wherein
- said holding means is integrally formed as one-piece with said internal thread member, said holding means being adapted to cause said internal thread member to be drawn out of said attaching hole with said body member at the time of removal of said body member.

13. A screw grommet according to claim 12, wherein said holding means extends from internal thread member and is adapted to undergo resilient deformation.

14. A screw grommet according to claim 12, wherein the diameter of said holding means is reduced during insertion of said internal thread member into the interior of said leg member, said holding means being held by said leg member by engaging edges of said opening portions of said leg member as said holding means is pressed toward said head member.

15. A screw grommet according to claim 12, wherein each wall of two opposing walls of said leg member is provided with a pair of parallel slits, each pair of parallel slits defining therebetween a resiliently deformable portion which is deformable in directions of enlarging and reducing the diameter of said leg member, each said resiliently deformable portion including an engaging hole so as to allow an engaging projection formed on said internal thread member to releasably engage said engaging hole.

16. A screw grommet according to claim 14, wherein said holding means comprises a resilient member adapted to project through said opening portions in the direction of enlarging the diameter of said leg member by undergoing resilient deformation as said internal thread member moves in a direction of approaching said head member, so as to clamp said panel member in cooperation with said head member for attachment of said screw grommet to said panel member.

17. A screw grommet according to claim 16, wherein said resilient member is adapted to undergo resilient deformation in the direction of reducing the diameter of said leg member as said internal thread member moves in a direction away from said head member.

18. A screw grommet according to claim 12, wherein said internal thread member further comprises a bendable portion to allow rotation of said holding means about said bendable portion.

19. A screw grommet according to claim 18, wherein said bendable portion is defined by two grooves extending along opposite sides of said internal thread member.

20. A screw grommet with which an externally threaded member is threadedly engaged in a state in which said screw grommet is inserted through an attaching hole formed in a panel member for attachment of said screw grommet thereto, said screw grommet comprising:
- a head member adapted to abut against a surface of said panel member for attachment of said screw grommet thereto and through which said externally threaded member is passed;
- a leg member formed integrally on an underside of said head member in such a manner as to project therefrom, said leg member having a hollow interior with a square cross section, said leg member being inserted through said attaching hole formed in said panel member and being provided with two opening portions formed in opposite walls of said leg portion;
- an internal thread member having a substantially rectangular outer peripheral cross section, and being inserted in a distal end of said leg member and into the interior of said leg member, said internal thread member being formed in such a manner as to be incapable of rotating inside said leg member but movable in the directions of insertion and withdrawal of said externally threaded member, and said externally threaded member passing through said head member and being threadedly engaged with said internal thread member; and
- holding means integrally formed as one-piece with said internal thread member, said holding means being resiliently deformable as said externally threaded member is threadedly engaged with said internal thread member, said holding means and said head member being adapted to clamp said panel member for attachment of said screw grommet thereto, said holding means being arranged such that, at the time of removal of said externally threaded member, the diameter of said holding means is reduced, and said holding means is engaged with said leg member to hold said internal thread member to said head member.

21. A screw grommet according to claim 20, wherein said leg member is provided with a pair of parallel slits formed in each of two opposing walls thereof such that each pair of parallel slits defines therebetween a resiliently deformable portion with is deformable in directions of enlarging or reducing the diameter of said leg member, each resiliently deformable portion including an engaging hole so as to allow an engaging projection formed on said internal thread member to releasable engage said engaging hole.

22. A screw grommet according to claim 20, wherein said holding means comprises a resilient member adapted to project through said opening portions in a direction of enlarging the diameter of said leg member by undergoing resilient deformation as said internal thread member moves in a direction of approaching said member at the time of threaded engagement of said externally threaded member.

23. A screw grommet according to claim 20, wherein said head member is provided with an inclined surface for enlarging the diameter of said holding means by engaging said internal thread member when said externally threaded member is threadedly engaged with said internal thread member.

24. A screw grommet according to claim 20, wherein said internal thread member further comprises a bendable portion to allow rotation of said holding means about said bendable portion.

25. A screw grommet according to claim 24, wherein said bendable portion is defined by two grooves extending along opposite sides of said internal thread member.

* * * * *